United States Patent [19]

Mueller

[11] Patent Number: 5,104,954
[45] Date of Patent: Apr. 14, 1992

[54] THERMOSTROPIC BIPHILIC HYDROGELS AND HYDROPLASTICS

[75] Inventor: Karl F. Mueller, New York, N.Y.

[73] Assignee: Ciba-Geigy Corporation, Ardsley, N.Y.

[21] Appl. No.: 620,223

[22] Filed: Nov. 29, 1990

Related U.S. Application Data

[63] Continuation-in-part of Ser. No. 343,979, Apr. 26, 1989, abandoned, which is a continuation-in-part of Ser. No. 200,212, May 31, 1988, abandoned, which is a continuation-in-part of Ser. No. 105,070, Oct. 5, 1987, abandoned.

[51] Int. Cl.$^5$ .................. C08F 218/00; C08L 39/00
[52] U.S. Cl. .................. 526/307.7; 526/307.5; 524/555
[58] Field of Search .................. 526/307.7, 307.5; 524/555

[56] References Cited

U.S. PATENT DOCUMENTS

| | | | |
|---|---|---|---|
| 3,936,513 | 2/1976 | Lorenz et al. | 260/898 |
| 4,067,839 | 1/1978 | Schultz | 526/303 |
| 4,259,465 | 3/1981 | Barabas | 526/65 |
| 4,388,436 | 6/1983 | Chen | 524/553 |
| 4,548,990 | 10/1985 | Mueller et al. | 525/123 |
| 4,625,009 | 11/1986 | Izumitani et al. | 526/307.5 |

FOREIGN PATENT DOCUMENTS

| | | |
|---|---|---|
| 1195050 | 6/1965 | Fed. Rep. of Germany . |
| 85208336 | 7/1968 | Japan . |
| 86066707 | 8/1970 | Japan . |
| 60-250015 | 5/1984 | Japan . |
| 899342 | 6/1962 | United Kingdom . |
| 962109 | 6/1964 | United Kingdom . |
| 1467416 | 3/1977 | United Kingdom . |

*Primary Examiner*—Joseph L. Schofer
*Assistant Examiner*—N. Sarofim
*Attorney, Agent, or Firm*—Luther A. R. Hall

[57] ABSTRACT

Novel hydrogels and hydroplastics are described which exhibit temperature dependent, reversible phase separations and clear-opaque transitions between 1° and 100° C. These materials consist of linear or crosslinked random copolymers of N,N-dimethylacrylamide with alkyl- and alkoxyalkyl acrylates. The water solubility and water swelling of these polymers is extremely temperature dependent; they show sharply defined clear to opaque transitions in their water swollen state and as soluble polymers shown Lower Critical Solution Temperatures (LCST). They are useful in drug delivery systems, absorption and extraction processes and as qualitative thermometers, thermosensors and self-activating sunscreens, for example in greenhouses.

19 Claims, No Drawings

THERMOSTROPIC BIPHILIC HYDROGELS AND HYDROPLASTICS

This is a continuation-in-part application of application Ser. No. 343,979, filed on Apr. 26,1989, now abandoned, which is a continuation-in-part application of application Ser. No. 200,212, filed May 31, 1988, now abandoned, which is in turn a continuation-in-part application of application Ser. No. 105,070, filed on Oct. 5, 1987, now abandoned.

BACKGROUND OF THE INVENTION

Many polymer solutions exhibit a cloud point phenomenon, which occurs at the cloud point temperature, above or below which the polymer is soluble and the solution is clear, but below or above which it becomes insoluble and precipitates and solutions become opaque. In most polymer-solvent systems solubility decreases with falling temperature, but in some cases involving polar polymers, the opposite occurs and the polymer suddenly precipitates at a specific, higher temperature, the cloud-point temperature, or lower critical solution temperature (LCST). If such clear to opaque transitions due to deswelling occur at a low enough temperature and are reversible, such polymer solutions or gels are useful in a variety of applications such as self-activating sunscreens or temperature dependent drug release systems. Polymer occurring at low temperatures have been described in Japanese patent Nos. 85 190444; 85 208336; and 86 66707; they consist of aqueous solutions or gels of poly-isopropylacrylamide and of isopropyl acrylamide/N-methylolacrylamide copolymers and of pyrrolidyl or piperidyl/acrylamide copolymers. Besides these acrylamides, N-iso-, N-n-, N-cyclopropylacrylamide and the corresponding methacrylamides are described in these patents, as well as N,N-diethylacrylamide as the only disubstituted acrylamide. Only these acrylamides or methacrylamides have a sufficiently hydrophobic component as part of their structure to form homopolymers, which can change from a hydrophilic water binding to a more hydrophobic water excluding structure at relatively low temperatures.

It has now unexpectedly been discovered that copolymers of N,N-dimethylacrylamide (DMA), which is very hydrophilic, but whose homopolymer by itself does not form a thermo-reversible aqueous solution, and hydrophobic $C_1$-$C_{18}$ alkyl acrylates or alkoxy-alkyl acrylates, as well as aryl and aralkyl acrylates, can be used to make aqueous solutions or gels, which exhibit LCST's, temperature dependent, reversible cloud points and swelling changes at low temperatures.

This was especially unexpected, since crosslinked hydrogels formed by copolymerization of dimethylacrylamide, 20-80% by weight, with $C_1$-$C_4$ alkyl acrylates or methacrylates, 80-20% by weight and a small amount of crosslinking agent are described in U.S. Pat. No. 4,067,839 as colorless clear gels and even especially claimed as contact lenses; indeed, it was very surprisingly found, that if within the range of the above specification only alkyl acrylates are used, the obtained hydrogels exhibit thermotropic, reversible cloud points between 0° to 90° C., making them very unsuitable as contact lenses, but useful as heat activated sunscreens for example.

The cloud-point and LCST phenomenon of the novel N,N-dimethylacrylamide copolymer gels and solutions was unexpected also in light of U.S. Pat. No. 4,625,009, wherein crosslinked copolymers of N,N-dimethylacrylamide with acrylic- or methacrylic acid and a wide variety of alkyl-acrylates and methacrylates are described as hydrogels with at least 60% water content, also for use as soft contact lenses; in all these hydrogels incorporation of acrylic- or methacrylic acid as a comonomer is absolutely essential in order to achieve the high degree of swelling in water and clarity. We have shown, that in the absence of the extremely hydrophilic, strongly hydrogen bonding comonomers acrylic or methacrylic acid, crosslinked compositions of U.S. Pat. No. 4,625,009 would not be as highly swollen as claimed and would not be clear at eye-temperature.

DETAILED DESCRIPTION

The polymers of this invention are random copolymers which possess in their water-equilibrated state a thermoreversible transition between 1° and 95° C. and which comprise the copolymerization product of (a) 20 to 85% by weight of N,N-dimethylacrylamide;

(b) 15 to 80% by weight of an aliphatic, cycloaliphatic, aromatic or alkaromatic hydrocarbyl acrylate with 1 to 18 carbon atoms, or of an alkoxy- or poly(alkoxy)-ethyl acrylate with 1 to 5 carbon atoms in the alkoxy moiety, or mixtures thereof, (c) 0 to 5% by weight of a polyolefinic crosslinking monomer, and (d) 0 to 20% by weight of one or more mono-olefinic monomers other than the acrylates of component (b), with the proviso, that if component (d) is zero and component (b) is methyl, ethyl, propyl or butyl acrylate, the polymer is uncrosslinked (c is zero).

Preferred polymers are those where there is 0% to 10% by weight of component (d).

Also preferred are polymers which are the copolymerization product of (a) 40 to 85 yl acrylamide and (b) 15 to 60% by weight of an alkyl or cycloalkyl acrylate with 1 to 12 carbon atoms in the hydrocarbyl moiety, or mixtures thereof, with the proviso, that if component (d) is zero and component (b) is methyl, ethyl, propyl or butyl acrylate, the polymer is uncrosslinked (c is zero).

Other preferred copolymers are those which comprises the copolymerization product of (a) 40 to 85% by weight of N,N-dimethylacrylamide and (b) 15 to 60% by weight of an alkyl or cycloalkyl acrylate with 1 to 12 carbon atoms the hydrocarbyl moiety, or mixtures thereof, with the proviso, that the product of the average number of carbon atoms in the hydrocarbyl moiety of the alkyl or cycloalkyl acrylate and the mol fraction of said acrylate in the polymer is 0.3 to 1.5, and wherein (c) and (d) are zero.

Also preferred are copolymers which comprise the copolymerization products of (a) 25 to 85% by weight of N,N-dimethylacrylamide, (b) 15 to 75% by weight of an aryl, alkaryl, alkyl or cycloalkyl acrylate or mixtures thereof which contains an average of 5 to 12 carbon atoms in the hydrocarbyl moiety, (c) 0 to 0.5% by weight of a polyolefinic crosslinking monomer, and wherein (d) is zero; copolymers which comprise the copolymerization products of (a) 25 to 60% by weight of N,N-dimethyl acrylamide, and (b) 75 to 40% by weight of an aryl, alkaryl, alkyl or cycloalkyl acrylate with 5 to 12 carbon atoms in the hydrocarbyl moiety, or mixtures thereof, and wherein (c) and (d) are zero; and copolymers which comprise the copolymerization product of (a) 30 to 70% by weight of N,N-dimethacrylamide, (b) 30 to 70% by weight of phenyl or benzyl acrylate and (c) 0 to 0.5% by weight of a polyolefinic crosslinking monomer.

Among most preferred copolymers of the instant invention are the copolymers which comprise the copolymerization products of:

(a) 40 to 70% by weight of N,N-dimethylacrylamide and (b) 30 to 60% by weight of methyl acrylate; or of:

(a) 45 to 75% by weight of N,N-dimethylacrylamide and (b) 25 to 55% by weight of ethyl acrylate; or of:

(a) 50 to 80% by weight of N,N-dimethylacrylamide and (b) 20 to 50% by weight of propyl or isopropyl acrylate; or of:

(a) 65 to 85% by weight of N,N-dimethylacrylamide and (b) 15 to 35% by weight of butyl, isobutyl, sec-butyl or tert-butyl acrylate.

Other preferred copolymers of this invention are those wherein the hydrocarbyl moiety of the acrylate component (b) is a cycloaliphatic moiety containing 6 to 12 carbons.

Other preferred copolymers of this invention are those wherein the alkyl acrylate is methyl, ethyl, propyl, isopropyl, butyl, isobutyl, sec-butyl or tert-butyl acrylate and components (c) and (d) are zero.

Still other preferred copolymers are those which are the copolymerization product of (a) 25 to 70% by weight of N,N-dimethacrylamide, (b) 30 to 75% by weight of ethoxy-, ethoxy-ethoxy, propoxy- or butoxyethyl acrylate or mixtures thereof, and (c) 0-0.5% by weight of a polyolefinic crosslinking monomer, and wherein (d) is zero.

Other preferred copolymers of this invention are those prepared in the presence of 0.5 to 10 mol %, based on the total olefinic monomers polymerized, of a chain transfer agent.

Still other preferred copolymers of this instant invention are those wherein both, component (c) and component (d), are each 0% by weight.

Useful hydrocarbyl acrylates (b) are: aliphatic $C_1$-$C_{18}$-n-alkyl acrylates, including: methyl-, ethyl-, propyl-, butyl-, hexyl-, octyl-, nonyl-, decyl-, dodecyl-, tridecyl- acrylates; branched chain alkyl acrylates with 5-14 C-atoms, including 2-ethylhexyl acrylate, isopropyl acrylate, tert.butyl and isobutyl acrylate; cycloaliphatic acrylates like cyclohexyl-, trimethylcyclohexyl-, cyclopentadienyl-, bornyl-, or isobornyl acrylate; aromatic and alkaromatic acrylates like phenyl and benzyl acrylate; alkoxy-alkyl and poly(alkoxy)-alkyl acrylates, where the alkoxy group contains 2-6 carbon atoms and the alkyl group 2 to 4 carbon atoms, for example n-butoxy-ethyl acrylate; Preferred are those hydrocarbyl acrylates containing an average of 1 to 12 carbon atoms in the hydrocarbyl group. Most preferred are those having 1 to 8 carbon atoms in the hydrocarbyl group. Also preferred are ethoxy- and ethoxy-ethoxy-ethyl acrylate.

These monomers can be used alone or in combination with each other and may contain minor amounts (e.g. up to 30 weight percent) of other comonomers such as alkyl-acrylates other than those mentioned above, alkyl-methacrylates, alkenoic acid-vinyl esters, alkyl-vinyl ethers, as well as alkyl fumarates and maleates, where the alkyl group contains 1-18 C-atoms; styrene; a-methylstyrene; silicone containing (meth-)acrylates, like tris(-trimethylsiloxanyl-)silyl-propyl methacrylate; fluorine containing (meth-)acrylates, like hexafluoroisopropyl methacrylate or 1,1,1,1-tetrahydro-heptadecylfluorodecyl acrylate and methacrylate; hydroxyethyl- and hydroxypropyl acrylate and methacrylate; polyethoxyethyl methacrylate; alkoxyalkyl (meth)acrylates with 3 to 20 carbon atoms in the alkoxy-alkyl group, like methoxy-ethyl acrylate and methacrylate and ethoxy- or ethoxy-ethoxy ethyl methacrylate, N-vinylpyrrolidone; acrylamide and N-isopropyl-, N-n-propyl-, N,N-diethyl-,N-2 and 3-hydroxy-propyl- and N-2-hydroxy-ethyl acrylamide-, N-cyclohexyl-, N-methyl-N-ethyl-acrylamide and methacrylamide; vinylacetamide; dimethylaminoethyl methacrylate and -methacrylamide; 2-isocyanatoethyl methacrylate or m-isopropenyl-a,a-dimethylbenzyl isocyanate can also be incorporated to introduce reactive sites for subsequent crosslinking reactions.

Where such other copolymerizable monomers are present, they may be present in amounts up to 20%, preferably up to 10% by weight.

If crosslinked polymers are desired, commonly used crosslinking polyolefinic monomers are added in amounts varying from about 0.005 to about 1% by weight. Typical examples of polyolefinic monomers are: Allyl acrylate and methacrylate, ethylene glycol-,diethylene glycol-, triethylene glycol-, tetraethylene glycol-, and generally poly(ethylene oxide) glycol diacrylates and dimethacrylates; 1,4-butane diol and poly(n-butylene oxide) glycol diacrylates and dimethacrylates; propylene glycol and poly(propylene oxide) glycol diacrylates and dimethacrylates; thiodiethylene glycol diacrylate and dimethacrylate; neopentylene glycol diacrylate and dimethacrylate; trimethylolpropane tri and tetraacrylate; pentaerythritol tri and tetraacrylate; divinylbenzene; divinyl ether; divinyl sulfone; disiloxanyl-bis-3-hydroxybutyl diacrylate or methacrylate and related compounds.

Bisphenol A diacrylate or dimethacrylate, ethoxylated bisphenol A diacrylate or dimethacrylate; methylene bisacrylamide or methacrylamide, dimethylene bisacrylamide or methacrylamide; allyl and diallyl maleate, triallyl melamine, diallyl itaconate, diallyl phthalate, triallyl phosphite, polyallyl sucrose, sucrose diacrylate, glucose dimethacrylate; also unsaturated polyesters, such as poly-(alkylene glycol maleates) and poly-(alkylene-glycol fumarates), like poly(propylene glycol maleate) and poly(polyalkyleneoxide glycol maleate).

Macromeric divinyl urethane compounds can also be used for copolymerization like poly-(ethylene oxide)-urethane dimethacrylate, poly-(tetramethylene oxide)-urethane dimethacrylate, as described in U.S. Pat. No. 4,192,827 or poly-(siloxane)-dialkylurethane dimethacrylates, as described in U.S. Pat. No. 4,605,712.

When the polymer of this invention contains in major amounts of components other than N,N-dimethylacrylamide and said hydrocarbyl acrylates (b), the cloud point effect may be weakened.

Where the polymer according to the present invention is substantially uncrosslinked and soluble in water below the cloud point, solutions containing such polymer exhibit the reversible clear to opaque transition and reversible precipitation. Preferably such solutions contain between about 90% to as little as about 0.1% by weight polymer. The preferred uncrosslinked polymers of this embodiment are those employing acrylate and acrylate mixtures containing an average of 1-4 C-atoms in the alkyl group, or ethoxyethyl acrylate, and those copolymers made from $C_3$–$C_{10}$ aliphatic and cycloaliphatic hydrocarbyl acrylates in the presence of 0.5-2.0 mol % of a chain-transfer agent.

The weight average molecular weight of the copolymers can vary widely without substantially affecting the basic reversible properties of the polymer. Thus, the polymer can vary depending upon the desired physical characteristics desired, e.g. from oligomers to crosslinked polymer materials.

Where the polymer according to the present invention is not soluble in aqueous media, be it as crosslinked polymers, that is a hydrogel, or as linear non-soluble, but swellable polymers, that is a hydroplastic, the hydrated polymer composition preferably can contain between about 10% to about 98% water, more preferably between about 20% to about 90% by weight of the water swollen polymer.

The hydrated polymers exhibit a reversible clear to opaque cloud point transition at a temperature between 0° C. up to 100° C., depending upon the specific polymer composition chosen. The polymers exhibit clarity at temperatures below the transition point.

Accordingly, the hydrated copolymers are useful as qualitative thermometers, thermosensors, self-activated sunscreens and the like. For example, the copolymer in its hydrated state, either as an aqueous gel or solution, can be placed between transparent plates, such as glass or plastic to form a self-activating sunscreen or thermoregulator. This sandwich structure has to be sealed to prevent loss of water from the hydrated polymer contained within the transparent plates. As the plate temperature rises to exceed the transition temperature, the hydrated polymer opacifies, thereby blocking a portion of sunlight normally passing through the plates. As a result, such sandwich plates can be used in greenhouses to modulate the amount of sunlight and sunlight generated heat within a greenhouse, or to moderate the amount of sunlight generated heat within a structure, such as a house or office, containing the aforementioned sandwich plates, for example as windows, skylights and the like. Depending upon the environment, the thickness of the gel or solution within such plates can vary widely, but is preferably between about 0.01 and 50 mm.

At their LCST the polymers become insoluble in water or, if in a crosslinked state, shrink from a high to a low water content gel. This shrinkage is especially pronounced when the crosslinked polymers are synthesized as 10-50% solutions in good solvents. Such heat sensitive reversibly swelling gels and/or reversibly precipitating and dissolving polymers are useful as active-ingredients absorbing and releasing gels, as extracting polymers and as heat activated membranes, changing from a high-permeability hydrophilic state to a low permeability hydrophobic state over a narrow temperature range.

The LCST phenomenon and the accompanying precipitation or shrinkage of the polymer is not restricted to exclusively aqueous solutions or gels; amounts of an organic solvent up to their solubility limit in the system can be present, especially aprotic solvents such as ketones, esters, ethers or lactones, for example methyl ethyl ketone, isopropyl acetate, dimethylsulfoxide or N-methylpyrrolidone, to name a few. Addition of methyl-ethyl ketone, for example, allows one to raise the cloud point temperature. Aqueous solutions of the novel polymers containing up to 30% of solvents with at least 1% solubility in water, are therefore another embodiment of the instant invention.

These aqueous solutions of the novel polymers can subsequently be transformed into gels by incorporating them into known gel forming media, for example into a polyacrylamide gel recipe as used for electrophoresis, agar-agar gels, polyvinylalcohol and poly-ethyleneoxide gels, proteinaceous gels or cellulosic gels, like hydroxy-ethyl cellulose. Such aqueous gels containing dissolved or dispersed therein polymers with thermoreversible cloud points between 0° and 50° C. are another embodiment of this invention.

In the presence of hydrophobic n-alkyl or n-alkoxyalkyl acrylate moieties the polymers are often extremely tacky in the dry as well as in the water swollen, or hydrated, state and can therefore be used as adhesives, both in their hydrogel and in their hydroplastic state. This property can be exploited, for example, in bioadhesives, for instance in adhesive patches for the mouth. On the other hand, cycloaliphatic acrylates such as cyclohexyl and trimethylcyclohexyl acrylate give polymers which are hard and glassy at room temperature and therefore are uniquely suited to make the polymers in form of beads by suspension polymerization in aqueous brine and for applications where tackiness is undesirable.

SYNTHESIS

The polymerization is suitably carried out with a free radical generating initiator at a temperature in the range from about 30° C. to about 150° C., the preferred temperature ranges being between about 45° C. and about 80° C. These initiators are preferably peroxides or azo catalysts having a half-life at the polymerization temperature of at least 20 minutes. Typical useful peroxy compounds include: isopropyl percarbonate, tert-butyl peroctoate, benzoyl peroxide, lauryl peroxide, decanoyl peroxide, acetyl peroxide, succinic acid peroxide, methyl ethyl ketone peroxide, tert.-butyl peroxyacetate, propionyl peroxide, 2,4-dichlorobenzoyl peroxide, tert.-butyl peroxypivalate, pelargonyl peroxide, 2,5-dimethyl-2,5-bis(2-ethyl-hexanoyl peroxy) hexane, p-chlorobenzoyl peroxide, tert.-butyl peroxybutyrate, tert.-butyl peroxymaleic acid, tert.-butyl peroxyisopropyl carbonate, bis-(1-hydroxy-cyclohexyl) peroxide; azo compounds include: 2,2-azo-bis-isobutyronitrile; 2,2'-azo-bis(2,4-dimethylvaleronitrile); 1,1'-azo-bis (cyclohexane carbonitrile), 2,2'-azo-bis (2,4-dimethyl-4-methoxyvaleronitrile).

Other free radical generating mechanisms can be employed, such as x-rays, electron-beams and UV-radiation. Preparation of crosslinked films and sheets by UV radiation in the presence of a photo-initiator such as diethoxyacetophenone, 1-hydroxycyclohexyl phenyl ketone, 2,2-dimethoxyphenylacetophenone, phenothiazine, diisopropylxanthogen disulfide, benzoin, benzoin methyl ether and other benzoin derivatives is a preferred method.

The amount of initiator can vary from 0.002% to 1% by weight of the monomer, but is preferably from 0.03 to 0.3% by weight thereof.

Especially useful are linear polymers synthesized in the presence of a chain transfer agent in order to reduce the molecular weight (MW) and thereby obtain a polymer which is more easily handled in the water-equilibrated state than is a high MW-polymer. Any chain-transfer agent commonly used to modify the MW of free-radical polymerized vinyl polymers can be used, for example branched or linear alkyl thiols with 2–21 C atoms; mercapto acids like thioacetic-, thiopropionic-, thioglycolic-, thiomalic acid; thio-alcohols like thioethanol or thioglycerol; as well as fluorinated thiols like perfluoroalkyl-alkylene-thiols, where perfluoroalkyl is a group with 2–10 C atoms, also halogenated solvents such as chloroform, carbon tetrachloride, 1,1,1-trichloroethane and trichloroethylene.

The novel polymers can be synthesized in bulk or in solution using conventional techniques. Crosslinked and uncrosslinked polymer sheets or films for example can easily be synthesized by filling the monomer mixture, which contains heat- or UV-activated free radical initiators, into a mold held together by clamps and preferably lined with a mold releasing polymer, followed by exposing the assembly to heat or UV radiation or both for several hours. The monomers may be dissolved in solvents and such solvents may be present in amounts up to 90%. Conventional solution polymerization can be carried out in any suitable solvent, which may be ketones, esters, ethers, alcohols, amides etc., such as acetone, methyl ethyl ketone, isopropyl acetate, N,N-dimethylformamide, N-methylpyrrolidone, dioxane, ether, ethanol, isopropanol and butanol. The resulting polymers can be cast on substrates and dried to form films which can be subsequently equilibrated in water.

The novel polymers can also be synthesized by suspension polymerization in aqueous brine in form of round beads, using freshly precipitated inorganic salts or hydroxides, or watersoluble organic polymers as stabilizers. Useful are copolymers of N,N-dimethylacrylamide with aliphatic, cycloaliphatic, aromatic or alkaromatic hydrocarbyl acrylates with 1 to 12 carbon atoms in the hydrocarbyl moiety, or with alkoxy- or poly(alkoxy)ethyl acrylate with 2 to 5 carbon atoms in the alkoxy moiety, or mixtures thereof, 0 to 5% by weight of a polyolefinic crosslinking monomer and 0 to 20% by weight of one or more monoolefinic monomers other than the acrylates of component (b).

Especially useful are suspension polymerized beads of 0.2–2 mm diameter, which comprise the copolymerization product of:

(a) 20 to 85% by weight of N,N-dimethylacrylamide;
(b) 15 to 80% by weight of an aliphatic alkyl acrylate with 1 to 5 carbon atoms in the alkyl moiety, or ethoxy or ethoxy-ethoxy ethyl acrylate or mixtures thereof,
(c) 0.01 to 1% by weight of a polyolefinic crosslinking monomer, and
(d) 0 to 10% by weight of one or more monoolefinic monomers other than the acrylates of component (b).

Due to their thermo-reversible swelling such beads are useful for absorbing active ingredients at a low temperature for release at a higher temperature and for the removal of peptides, proteins, sugars or of toxic compounds from aqueous solutions. Such beads are therefore another embodiment of this invention.

It is a characteristic property of the novel hydrophilic copolymers of N,N-dimethylacrylamide with over about 40% of an alkyl acrylate with more than 2-C atoms in the alkyl group that even with a linear molecular structure they are not infinitely soluble in water, but form viscous, syrupy plastics dependent on their molecular weight, which can be coated or extruded; these water-plasticized, but water insoluble linear and free-flowing polymers can be called hydroplastics, to be distinguished from hydrogels, which are crosslinked and no longer free-flowing and moldable; if suitable reactive sites are built in, as for example, epoxy groups or UV-crosslinkable cinnamyl groups, these hydroplastics can subsequently be crosslinked into a hydrogel.

When the novel hydrogels are synthesized in bulk, their water content at equilibrium varies slightly with the equilibration temperature, being higher at lower temperatures. The cloud point is therefore a function also of the equilibration temperature, being a constant temperature differential higher. With the same polymer therefore cloud points can vary over a several degree range, dependent on equilibration temperature.

In the following examples the water content is defined as $$DSw\ (\%) = \frac{\text{weight of wet sample} - \text{weight of dry sample}}{\text{weight of wet sample}}$$

and swelling ratio as $$SR = \frac{\text{weight of swollen sample}}{\text{weight of dry sample}}.$$

The LCST of watersoluble polymers was determined visually by immersing test tubes with 1% aqueous solutions in a water bath and raising the temperature by 1° C. per minute.

EXAMPLE 1

4 g N,N-Dimethylacrylamide (DMA), 6 g 2-ethylhexyl acrylate (EHA) and 0.01 g ethylene glycol dimethacrylate (XL) are mixed together with 0.01 g benzoin methyl ether (BME). The mixture is degassed 3 times in vacuo and kept under a dry $N_2$-blanket. A 4×4 inch glass mold, lined with MYLAR and held together by clamps is assembled, using 0.5 mm silicone cord as spacer. The mold was filled with the monomer mixture and exposed to UV-light for 4 hours. Subsequently, the mold is disassembled and the clear, flexible polymer sheet is immersed in distilled water and allowed to swell to equilibrium (=DSw).

The swollen polymer has a DSw of 21.9% at 20° C. and exhibits a thermoreversible cloud point of 23° C.

EXAMPLES 2–6

Using the procedure described in Example 1, the following polymers are prepared and their DSw and cloud points determined (all polymers contain 0.1 ethyleneglycol dimethacrylate).

| | Thermotropic-biphilic Hydrogels: Effect of DMA/EHA Ratio on Water Swelling, and Cloud Point (CP) | | | |
|---|---|---|---|---|
| | Composition* % (by weight) | | DSw (%) | CP (°C.) |
| Ex. | DMA | EHA | at 15° C. | Effect |
| 2 | 20 | 80 | 12.5 | — |
| 3 | 30 | 70 | 13 | 17 strong |
| 1 | 40 | 60 | 21 | 23 strong |
| 4 | 50 | 50 | 34 | 24 strong |
| 5 | 60 | 40 | 49 | 31 weaker |
| 6 | 70 | 30 | 65 | 36 weak |

*DMA is N,N-dimethylacrylamide
EHA is 2-ethylhexyl acrylate

EXAMPLES 7-8

Using the procedure of Example 1 the following polymers are prepared, using different levels of crosslinker EGDMA.

| Ex. Nr. | Composition*, % by weight | | | C.P. at 20° C. | DSw % |
|---|---|---|---|---|---|
| | DMA | EHA | EGDMA | | |
| 7 | 50 | 50 | 0.5 | 27 | 30 |
| 8 | 50 | 50 | 0.2 | 34 | 25 |
| 4 | 50 | 50 | 0.1 | 36 | 24 |

*DMA is N,N-dimethylacrylamide
EHA is 2-ethylhexyl acrylate
EGDMA is ethylene glycol dimethacrylate.

EXAMPLES 9-25

Thermotropic/biphilic Hydrogels: Effect of comonomer on water swelling and cloud point of DMA-copolymers.

Using the procedure of Example 1, the copolymers listed in the following table are prepared, using 0.1% ethylene glycol dimethacrylate as crosslinker. Their water contents and cloud points are determined as described.

| EX. No. | Composition (% by weight) | | | DSw % at 20° C. | CP Effect |
|---|---|---|---|---|---|
| | DMA | Other (Hydrophobe) | | | |
| 9 | 40 | methyl-A | 60 | 57 | medium |
| 10 | " | ethyl-A | " | 63 | medium |
| 11 | " | octyl-A | " | 21 | strong |
| 12 | " | decyl-A | " | 26 | strong |
| 1 | " | 2-ethylhexyl-A | " | 22 | strong |
| 13 | 50 | propyl-A | 50 | 49 | strong |
| 14 | " | isopropyl-A | " | 50 | strong |
| 15 | " | butyl-A | " | 36 | strong |
| 16 | " | isobutyl-A | " | 38 | strong |
| 17 | " | octyl-A | " | 37 | strong |
| 4 | " | 2-ethylhexyl-A | " | 34 | strong |
| 18 | " | decyl-A | " | 38 | strong |
| 19 | " | dodecyl-A | " | 41 | weak |
| 20 | " | octadecyl-A | " | 38 | very weak |
| 21 | " | cyclohexyl-A | " | 33 | strong |
| 22 | " | trimethylcyclohexyl-A | " | 35 | strong |
| 23 | " | phenyl-A | " | 30 | strong |
| 24 | " | benzyl-A | " | 25 | strong |
| 25 | 50 | 2-ethylhexyl-MA | 50 | 46 | very weak |
| 26 | " | butyl-MA | " | 52 | very weak |
| 27 | 40 | methyl-MA | 60 | 44 | very weak |
| 28 | " | isopropyl-MA | " | 32 | very weak |
| 29 | " | trimethylcyclohexyl-MA | " | 21 | very weak |

A: acrylate
MA: methacrylate
CP: cloud point
DSw: water content, based on swollen polymer (w/w).

The data show that only the acrylates, not the methacrylates, give polymer gels with strong temperature induced cloud points. The observed cloud points are all between 25° and 35° C., when the temperature is raised from 20° C.

EXAMPLES 30a AND 30b

Synthesis of linear polymers a) 12 g N,N-dimethylacrylamide (DMA) and 8 g 2-ethylhexyl acrylate (EHA) are dissolved in 20 g ethanol, together with 0.02 g 2,2'-azobis(2,4-dimethylvaleronitrile(VAZO-52) as initiator. The mixture is stirred under dry nitrogen for 24 hours at 60° C. A viscous polymer solution is obtained with a conversion of 97%, determined gravimetrically.

A sample of the solution is poured on a glass plate and allowed to dry. The dry coating is equilibrated in water for 10 hours, absorbing 41% water without dissolving; it is covered with a second glass plate and both plates sealed by tape. The composite laminate window-pane has a reversible cloud point of 22° C.

b) Using the same procedure a linear copolymer consisting of 40% DMA and 60% EHA is prepared, which in the water swollen state has a cloud point of 25° C.

EXAMPLES 31a TO 31s

Using the same procedure as in Example 26a, 50% solutions in ethanol of linear copolymers of N,N-dimethylacrylamide (DMA) with various amounts of methyl acrylate, ethyl acrylate, n-propyl, n-butyl, and n-octyl acrylate are prepared. After evaporating the ethanol, the octyl acrylate copolymer forms a hydroplastic in water, with a cloud point of 25° C.; the methyl-to butyl-acrylate copolymers are water soluble, and exhibit Lower Critical Solution Temperatures (LCST).

| Example Nr. 31- | Alkyl acrylate comonomer | | | Hy.phob C-atom Index[1] | LCST °C. |
|---|---|---|---|---|---|
| | alkyl- | weight % | mol % | | |
| a | methyl- | 30 | 33 | 0.33 | 98 |
| b | " | 40 | 43 | 0.43 | 65 |
| c | " | 50 | 54 | 0.54 | 41 |
| d | " | 55 | 59 | 0.59 | 21 |
| e | " | 60 | 64 | 0.64 | 6 |
| f | " | 70 | 73 | 0.73 | <0 |
| g | ethyl- | 25 | 25 | 0.5 | 74 |
| h | " | 30 | 30 | 0.6 | 61 |
| i | " | 50 | 50 | 1.0 | 14 |
| j | " | 55 | 55 | 1.1 | <0 |
| k | propyl- | 20 | 18 | 0.54 | 80 |
| l | " | 30 | 27 | 0.81 | 44 |
| m | " | 40 | 37 | 1.11 | 21 |
| n | " | 50 | 47 | 1.4 | 8 |
| o | butyl- | 15 | 12 | 0.3 | 73 |
| p | " | 20 | 16 | 0.64 | 50 |
| q | " | 30 | 25 | 1.0 | 21 |
| r | " | 35 | 30 | 1.2 | 8 |
| s | octyl- | 50 | 35 | 1.58 | <0 |

[1] hydrophobic carbon atom index, defined as average number of C atoms in the ester group of the comonomer × mol fraction of comonomer.

EXAMPLES 32a TO 32d

The procedure of Example 31i is repeated, using the monomer mixtures indicated below with 0.5 g dodecyl mercaptan as a chain transfer agent. Clear viscous resins are obtained with essentially 100% conversion. The polymers are dissolved in water and as 1% solutions have the following LCST"s:

| Ex. 32- | Composition (% by weight) | | | $C_{12}H_{25}SH$ (pph) | LCST °C. |
|---|---|---|---|---|---|
| | DMA* | Ethyl Acrylate | Methyl Acrylate | | |
| a | 50 | 50 | — | — | 16 |
| b | 50 | 37.5 | 12.5 | 5 | 20 |
| c | 50 | 25 | 25 | 5 | 26 |
| d | 50 | 12.5 | 37.5 | 5 | 30 |

*DMA is N,N-dimethylacrylamide

The results show that the LCST rises with increasing hydrophilicity of the copolymer.

EXAMPLES 33-34

Biphilic Hydrogels: Comparison of NVP with DMA as Hydrophile and of EHA with EHMA as Hydrophobe[2]

Following the procedure described in Example 1, the copolymers listed below are prepared and their water content, cloud points and appearance noted (0.1% ethylene glycol dimethacrylate as crosslinker).

| | Composition | | | | | | Cloud Point |
|---|---|---|---|---|---|---|---|
| | Hydrophile | | Hydrophobe | | | | |
| | DMA % | NVP % | EHA % | EHMA % | DSw % | Appearance[1] | °C. and Strength |
| Ex. | (by weight) | | | | (22° C.) | Dry  Wet | of Effect |
| 33 | — | 40 | 60 | — | 20.7 | cl   sh | >70 |
| 34 | — | 40 | — | 60 | 20.5 | sh   sh | none |
| 35 | 40 | — | 60 | — | 20 | cl   cl | 25, strong |
| 36 | 40 | — | — | 60 | 29 | sh   vsh | >90, weak |
| 37 | 50 | — | 50 | — | 34 | cl   cl | 24, strong |
| 38 | 50 | — | — | 50 | 46 | sh   cl | >90, weak |

[1] cl: clear
sh: slight haze
vsh: very slight haze
[2] EHA: 2-ethylhexyl acrylate
EHMA: 2-ethylhexyl methacrylate
DMA: N,N-dimethylacrylamide
NVP: N-vinylpyrrolidone The results demonstrate that only DMA, not NVP, and only the acrylate, not the methacrylate copolymers exhibit low temperature cloud point phenomena.

EXAMPLES 39-41

Following the procedure of Example 1, the following copolymers of 2-hydroxyethyl acrylate (HEA) and 2-ethylhexyl acrylate (EHA) are prepared; no cloud points are observed.

| | Composition | | | Appearance | |
|---|---|---|---|---|---|
| | Hydrophile | Hydrophobe | | Dry | Wet |
| Ex. No. | HEA % | EHA % | DSw % | (0–100° C.) | |
| | (by weight) | | (at 22° C.) | no cloud point | |
| 39 | 62 | 38 | 21 | clear | clear |
| 40 | 50 | 50 | 15 | " | " |
| 41 | 35 | 65 | 6.5 | " | " |

EXAMPLE 42

10 g N,N-Dimethylacrylamide (DMA), 10 g 2-ethylhexyl acrylate (EHA) and 1 g dodecyl mercaptan ($C_{12}$-SH) are mixed together with 10 g ethanol and 0.05 g 2,2'-azobis(2,4-dimethylvalero nitrile)(VAZO-52). The solution is sparged with nitrogen and stirred in a screw-cap bottle on a water bath for 24 hours at 55° C. Conversion to polymer, by gravimetry, is >99%. The polymer, which has a calculated molecular weight $MW_N$ of 4040, absorbed 36% water (23.C), forming a clear water-insoluble hydroplastic which is flowable enough to allow preparation of bubble-free 0.1 mm–1.0 mm casts between sealed glass plates and which has a reversible cloud point at 23° C.

EXAMPLE 43

10 g N,N-Dimethylacrylamide (DMA), 5 g 2-ethylhexyl acrylate (EHA) and 5 g methyl acrylate (MA) are mixed together with 20 g ethanol and 0.05 g 2,2'-azobis(2,4-dimethylvaleronitrile)(VAZO-52). The solution is sparged with nitrogen and stirred in a screw-cap bottle on a water bath for 24 hours at 55° C. Conversion, by gravimetry, is 100%. The hydroplastic polymer absorbs 48% water (20° C.) and has a cloud point of 23° C.

The same procedure is repeated, using 10 g DMA, 2.5 g EHA and 7.5 g MA as comonomer. The polymer absorbs 70% water (22° C.), forming a whitish paste and has a cloud point of 5° C.

EXAMPLES 44-46

Using the procedure described in Example 1 the following copolymers of 49.8% N,N-dimethylacrylamide (DMA), 30% 2-ethylhexyl acrylate (EHA), 0.2% ethyleneglycol dimethacrylate and 20% (all by weight) of three other comonomers[1], are synthesized and their water contents and cloud points determined:

| Ex. | Comonomer[1] | water content (at 22° C.) | Cloud Point °C. |
|---|---|---|---|
| 44 | $Si_4MA$ | 39 | 40 |
| 45 | $F_nA$ | 41 | 40 |
| 46 | MMA | 42 | 40 |

[1] $Si_4MA$: tris-(trimethylsiloxy)silyl-propyl methacrylate $F_nA$: perfluoroalkyl-ethyl acrylate with an $R_f$-distribution of $C_6F_{13}/C_8F_{17}/C_{10}F_{21}/C_{12}F_{25} = 6/60/25/10$ MMA: methyl methacrylate

EXAMPLES 47 AND 48

5 g N,N-Dimethylacrylamide, 5 g ethyl acrylate and 0.01 g ethylene glycol dimethacrylate are dissolved in 10 g ethanol together with 0.02 g benzoin methyl ether. The mixture is added to a MYLAR-lined glass mold, using a 1 mm spacer, and irradiated by UV for 18 hours. A clear, soft crosslinked polymer sheet is obtained, which is extracted and equilibrated in water.

Using the same process, a polymer sheet is prepared using a mixture of 2.5 g ethyl- and 2.5 g methyl acrylate as hydrophobic comonomers.

The following table shows the DSw values and, in brackets, the swelling ratio SR (=weight of swollen polymer/weight of dry polymer) of both polymers at various temperatures.

| Ex. No. | DSw, (SR) at different temperatures: | | | |
| --- | --- | --- | --- | --- |
| | 9° C. | 25° C. | 33° C. | 40° C. |
| 47 | 86 (7.1) | 67 (3.0) | 61 (2.5) | 58 (2.4) |
| 48 | 91 (11.1) | 73 (3.7) | 71 (3.5) | 58 (2.4) |

The following examples demonstrate the effect of a cosolvent on LCST.

EXAMPLES 49–50

5 g N,N-Dimethylacrylamide (DMA) and 5 g ethyl acrylate (EA) are dissolved in 10 g methyl ethyl ketone (MEK), together with 0.05 g 2,2'-azobis(2,4-dimethyl-valeronitrile)(VAZO 52) and polymerized under a $N_2$-blanket at 55° C. for 18 hours and at 65° C. for 2 hours. A clear, viscous solution with 50.5% solids content Using the same procedure, a solution in MEK is prepared of a copolymer of 5 g DMA, 2.5 g ethyl acrylate (EA) and 2.5 g methyl acrylate (MA).

The 50% MEK solutions of these polymers are diluted in stages with distilled water and the cloud-point temperature of the solutions are determined.

| Ex. | Composition of Polymer (% by weight) | | | Composition of Solution, (% weight) | | | LCST °C. |
| --- | --- | --- | --- | --- | --- | --- | --- |
| | DMA | EA | MA | Polymer | MEK | Water | |
| 49 | 50 | 50 | — | 25.0 | 25.0 | 50 | 36 |
| | " | " | | 16.5 | 16.5 | 66 | 27 |
| | " | " | | 12.5 | 12.5 | 75 | 23 |
| | " | " | | 8.5 | 8.5 | 83 | 21 |
| | " | " | | 6.0 | 6.0 | 88 | 19 |
| | " | " | | 5.0 | 5.0 | 90 | 18 |
| 31i | " | " | | 1.0 | — | 99 | 16 |
| 50 | 50 | 25 | 25 | 16.5 | 16.5 | 66 | 39 |
| | " | " | " | 12.5 | 12.5 | 75 | 35 |
| | " | " | " | 8.5 | 8.5 | 83 | 32 |
| | " | " | " | 5.0 | 5.0 | 90 | 25 |
| 31j[1] | " | " | " | 1.0 | — | 99 | 26 |

[1] +5% chain transfer agent dodecyl mercaptan

The following examples demonstrate the synthesis of semi-Interpenetrating-Polymer Networks (IPN) of thermotropic polymers with poly(acrylamide) or agarose.

EXAMPLE 51

5.7 g of 12.6% solutions of the polymers of Ex. 32 a, b, c in a 95/5 (weight/weight) water/methyl ethyl ketone mixture are mixed with 4.0 g of an aqueous solution of 22.2% acrylamide and 0.6% methylene-bis acrylamide and 0.47 g of a 1.5% aqueous solution of $(NH_4)_2S_2O_8$. After degassing, the solutions are cooled to 10° C. and 0.012 g N,N,N',N'-tetramethylethylenediamine are added. The clear mixtures are poured into vials. Gelation occurs within 10 minutes. The gels have reversible cloud points of 10° C. (Poly. 32-a), 17° C. (Poly. 32-b) and 24° C. (Poly. 32-c).

EXAMPLE 52

10 g of a 1% solutions of the polymer of Example 32b in distilled water are mixed with 10 g of a hot 1% aqueous solution agarose, forming a fine white precipitate. The mixture is poured hot into a glasstube of 2mm inside diameter and allowed to cool to room temperature, forming a clear gel within few minutes. The gel has a reversible cloud point of 34° C.

EXAMPLE 53

The procedure of Example 51 is repeated, using a 10% aqueous solution of poly-(N-isopropylacrylamide) as thermotropic polymer system. A clear poly-(acrylamide) gel containing dissolved poly-(N-isopropyl acrylamide) is obtained with a thermo-reversible cloud point of 32° C.

The following examples describe poly(dimethylacrylamide-co-alkoxyalkyl acrylates) with lower critical solution temperatures.

EXAMPLE 54

5 g n-Butoxy-ethyl acrylate, 5 g N,N-dimethyl acrylamide and 10 g ethanol are mixed together in a bottle, together with 0.02 g 2,2'-azobis(2,4-dimethyl valeronitrile. The solution is degassed and sparged with nitrogen and stirred in a hot-water bath at 55° C. for 24 hours. A viscous, clear copolymer solution is obtained with a solids content of 49.8%.

1 g of the solution is evaporated to dryness, forming a tacky, clear polymer film; on equilibration in water at 10° C., the polymer forms a tacky hydroplastic with 49% water content.

EXAMPLE 55–57

Following the procedure of example 54, the following copolymers were synthesized and their LCST's determined on 1% aqueous solutions, as described. The results, together with those of example 54, are listed in the following table.

| Example Nr. | Composition, % by weight | | | Mol Ratio DMA/B | LCST °C. |
| --- | --- | --- | --- | --- | --- |
| | DMA | Acrylate Comonomer B | | | |
| 54 | 25 | ethoxyethyl- | 75 | 0.48 | 12 |
| 55 | 50 | ethoxyethyl- | 50 | 1.43 | 46 |
| 56 | 50 | (ethoxy)$_2$ethyl- | 50 | 1.89 | 62 |
| 57 | 50 | n-butoxy- | 50 | 1.68 | <0 |

The following example describes the synthesis of beads with thermo-reversible swelling in water.

EXAMPLE 58

12.5 g $MgCl_2 \times 6$ $H_2O$ and 360 ml of a 20 % NaCl solution in water are filled into a 3-neck flask equipped with a heating mantle, thermowatch, condenser, nitrogen inlet and a constant speed stirring motor. The brine is heated to 75° C. and the stirring speed is set at 500 rpm; the flask is sparged with nitrogen and 123 ml 1-normal NaOH are added dropwise. A mixture of 90 g N,N-dimethylacrylamide, 110 g methyl acrylate and 0.02 g ethyleneglycol dimethacrylate, containing 0.3 g t-butylperoctoate are added while stirring under nitrogen at 250 rpm. The mixture is stirred at 75° C. for 2 hours and for another hour at 85° C. 12 ml conc.HCl are added, the stirrer is stopped and the supernatant liquid is decanted from the beads, which are rinsed free of NaCl in distilled water. Round beads of 0.1–0.5 mm diameter are obtained, which exhibit a strong clear to opaque transition and thermoreversible swelling, with a swelling ratio of 15° at 5° C. and 2° at 60° C.

What is claimed is:

1. A random copolymer which in its water-equibrated state has a thermoreversible transition between 1° and 95° C. and which comprises the copolymerization product of:

(a) 20 to 85% by weight of N,N-dimethylacrylamide;

(b) 15 to 80% by weight of an aliphatic, cycloaliphatic, aromatic or alkaromatic hydrocarbyl acrylate with 1 to 18 carbon atoms in the hydrocarbyl moiety, or an alkoxy- or poly(alkoxy)ethyl acrylate with 2 to 5 carbon atoms in the alkoxy moiety, or mixtures thereof, (c) 0 to 5% by weight of a polyolefinic crosslinking monomer, and (d) 0 to 20% by weight of one or more monoolefinic monomers other than the acrylates of component (b), with the proviso, that if component (c) is greater than zero, component (d) is zero and component (a) is 20 to 55% by weight and the equilibrium water content of the crosslinked polymer is 12 to 55% by weight of the swollen gel, and with the further proviso that if component (b) is methyl, ethyl, propyl or butyl acrylate, the polymer is uncrosslinked (c=zero).

2. A copolymer according to claim 1 wherein component (d) is 0% to 10% by weight.

3. A coplymer according to claim 2 which comprises the copolymerization product of (a) 40 to 85% by weight of N,N-dimethylacrylamide and (b) 15 to 60% by weight of an alkyl or cycloalkyl acrylate with 1 to 12 carbon atoms in the hydrocarbyl moiety, or mixtures thereof, with the proviso, that if component (d) is zero and component (b) is methyl, ethyl, propyl or butyl acrylate, the polymer is uncrosslinked (c is zero).

4. A copolymers according to claim 3, wherein component (c) is zero.

5. A copolymer according to claim 2 which comprises the copolymerization product of (a) 40 to 85% by weight of N,N-dimethylacrylamide and (b) 15 to 60% by weight of an alkyl or cycloalkyl acrylate with 1 to 12 carbon atoms in the hydrocarbyl moiety, or mixtures thereof, with the proviso, that the product of the average number of carbon atoms in the hydrocarbyl moiety of the alkyl or cycloalkyl acrylate and the mol fraction of said acrylate in the polymer is 0.3 to 1.5, and wherein (c) and (d) are zero.

6. A copolymer according to claim 5, wherein the alkyl acrylate is methyl, ethyl, propyl, isopropyl, butyl, isobutyl, sec-butyl or tert-butyl acrylate.

7. A copolymer according to claim 2 which comprises the copolymerization product of (a) 25 to 85% by weight of N,N-dimethylacrylamide, (b) 15 to 75% by weight of an aryl, alkaryl, alkyl or cycloalkyl acrylate or mixture thereof which contains an average of 5 to 12 carbon atoms in the hydrocarbyl moiety, (c) 0 to 0.5% by weight of a polyolefinic crosslinking monomer and wherein component (d) is zero.

8. A copolymer according to claim 7, which comprises the copolymerization product of (a) 25 to 60% by weight of N,N-dimethylacrylamide, (b) 40 to 75% by weight of an aryl, alkaryl, alkyl or cycloalkyl acrylate or mixture thereof, which contains an average of 5 to 12 carbon atoms in the hydrocarbyl moiety, and wherein components (c) and (d) are zero.

9. A copolymer according to claim 2 which comprises the copolymerization product of (a) 25–70% by weight of N,N-dimethylacrylamide, and (b) 30–70% by weight of butoxyethyl, propoxyethyl, ethoxyethyl or ethoxy-ethoxyethyl acrylate or mixtures thereof.

10. A copolymer according to claim 9 wherein component (c) is zero.

11. A copolymer according to claim 6 which comprises the copolymerization product of (a) 40–70% by weight of N,N-dimethylacrylamide, and (b) 30–60% by weight of methyl acrylate.

12. A copolymer according to claim 6 which comprises the copolymerization product of (a) 45–75% by weight of N,N-dimethylacrylamide, and (b) 25–55% by weight of ethyl acrylate.

13. A copolymer according to claim 6 which comprises the copolymerization product of (a) 50–80% by weight of N,N-dimethylacrylamide, and (b) 20–50% by weight of propyl or isopropyl acrylate.

14. A copolymer according to claim 6 which comprises the copolymerization product of (a) 65–85% by weight of N,N-dimethylacrylamide, and (b) 15–35% by weight of butyl, isobutyl or tert-butyl acrylate.

15. A copolymer according to claim 5, wherein component (b) is a cycloalkyl acrylate with 6 to 12 carbon atoms in the cycloalkyl moiety.

16. A copolymers according to claim 2 which is the copolymerization product of (a) 30 to 70% by weight of N,N-dimethacrylamide, (b) 30 to 70% by weight of phenyl or benzyl acrylate and (c) 0–0.5% by weight of a polyolefinic crosslinking monomer.

17. A copolymer according to claim 16, wherein component (c) is zero.

18. A copolymer according to claim 2 which is prepared in the presence of 0.5 to 10 mol %, based on the total olefinic monomers polymerized, of a chain transfer agent.

19. A copolymer according to claim 2 wherein component (c) is 0% by weight.

* * * * *